United States Patent Office 3,028,163
Patented Apr. 3, 1962

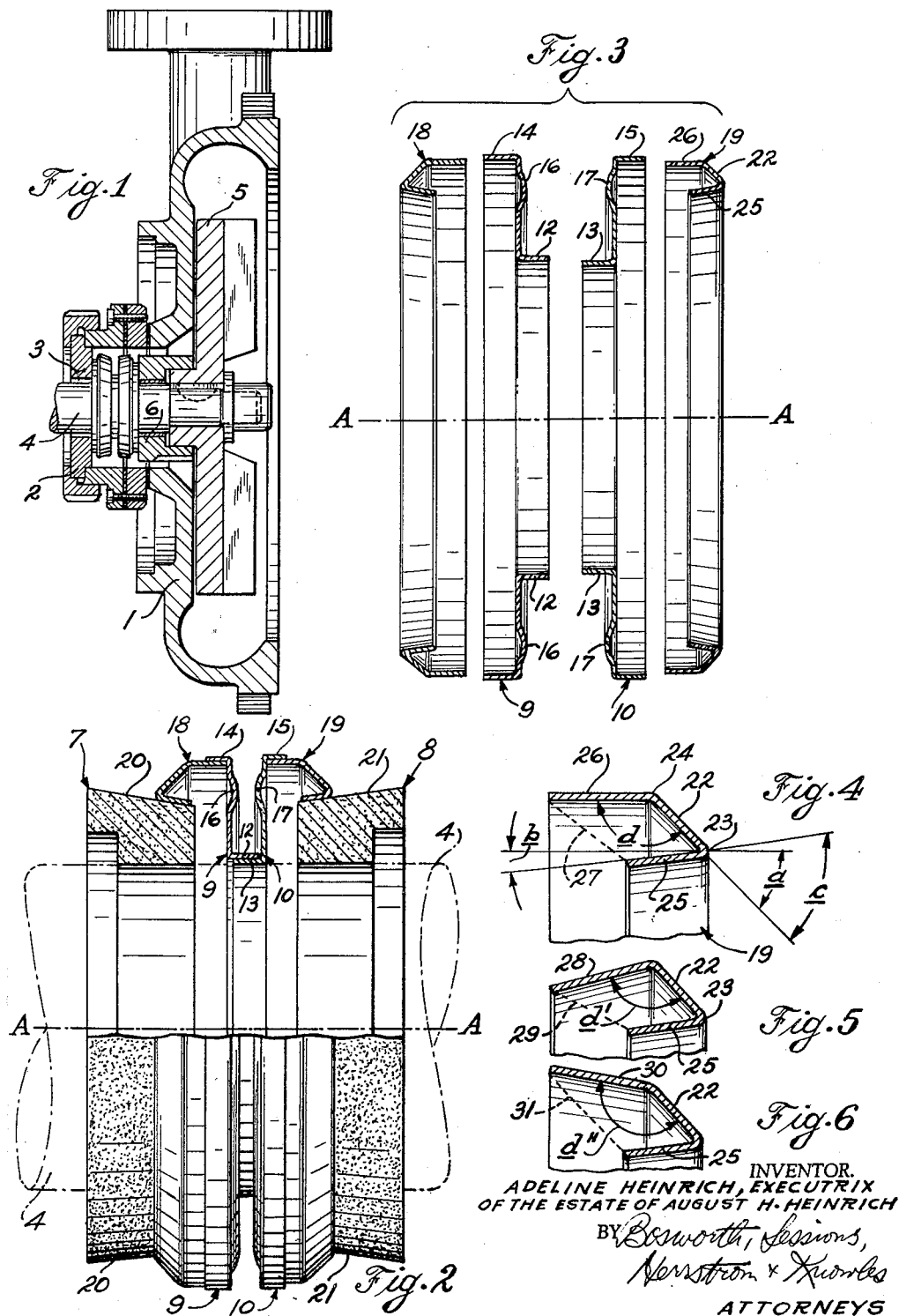

3,028,163
SEALING SYSTEMS FOR BEARINGS, SHAFTS, ETC.
August H. Heinrich, deceased, late of 1977 E. 221st St., Cleveland, Ohio, by Adeline Heinrich, executrix, Euclid, Ohio
Filed Oct. 7, 1959, Ser. No. 844,959
10 Claims. (Cl. 277—63)

This invention relates to improvements in sealing systems of kinds described in prior application Serial No. 471,341, filed November 26, 1954, for "Sealing System for Bearings, Shafts, etc." (Patent 2,941,825).

Among other things, such prior application discloses symmetrical sealing systems comprised of interconnected annular leaf springs, annular supporting channels carried by the springs, and frusto-conical sealing rings held fast to the channels in consequence of the presence in the two mutually engaging surfaces of a taper small enough to produce tenacious adherence. The outer sidewalls of the channels are attached to lip-like supporting flanges on the springs that may or may not stand normally to the general planes of the springs. The channels are so disposed that their bights are directed away from the surfaces engaged by the sealing faces of the sealing rings; i.e., they face toward the springs.

Sealing units so constructed sometimes tend to release the sealing ring or rings unexpectedly, notwithstanding the fact that the taper is small enough so that in theory the sealing ring and the supporting channel should adhere tenaciously to each other until forced apart by means of a tool. In most cases, this tenacious adherence is present from the start and, if so, it usually continues to characterize the assembly; however, experience shows that from time to time separation of the sealing ring or rings from the spring or springs does occur, either spontaneously or as a result of the imposition of relatively small forces on one or both. The reason for these occasional aberrations is not entirely understood, although excessive rigidity internally of the system is thought to be a factor.

It has now been observed that such separations occur less frequently or not at all if the angle defined by the channel bottom and the lip-like supporting flange on the spring is made materially larger than a right angle, as by slanting the channel bottom in relation to the side walls. In general, what appears to be established is that the angle in question must be substantially more than a right angle but substantially less than a straight angle. It is believed that if the angle is of the order of 135°, more or less, there may be greater flexibility in that part of the unit that impinges upon the sealing ring or rings as compared with the conditions which obtain when the angle is a right angle, as in the constructions described in the above-mentioned prior application. Although precise limitations cannot be postulated, partly because the optimum angle may vary with the material used in the fabrication on the channel, it appears that angles measuring more than 120° and less than 150° are most likely to be of value.

At any rate, the invention has for its principal object to supply a sealing unit, particularly a symmetrical sealing unit, that is free from the occasional separation of the sealing ring or rings that has tended to occur in systems of the types heretofore known. The advantages characterizing the invention, particularly those applicable to a symmetrical sealing unit, are applicable also to unsymmetrical sealing units such as have heretofore been suggested for use at the ends of anti-friction bearing assemblies; e.g., ball bearings, roller bearings, etc. Other objects, advantages and features of the invention will suggest themselves to those skilled in the art from the description which follows and from the accompanying drawings.

In such drawings:

FIGURE 1 is a central section with parts in elevation through a centrifugal pump incorporating a symmetrical sealing unit in conformity with the present invention, such section being on a reduced scale.

FIGURE 2 is an enlarged view partly in section and partly in elevation showing in greater detail the sealing unit incorporated in the pump of FIGURE 1.

FIGURE 3 is an exploded view of the central portion of the sealing unit of FIGURE 2 showing details of the annular leaf springs and the annular supporting channels for the sealing rings.

FIGURE 4 is a fragmentary showing on a still larger scale of a portion of one of the annular supporting channels appearing in FIGURE 2.

FIGURES 5 and 6 are views similar to that of FIGURE 4 showing modifications.

The centrifugal pump of FIGURE 1 includes a housing 1 provided, among other things, with a stationary end plate 2. Extending through opening 3 in end plate 2 is the usual pump shaft 4. At its outboard end, pump shaft 4 carries impeller 5 and impeller hub 6. Between end plate 2 and impeller 5 is the sealing unit of FIGURE 2. Such sealing unit rides with a running fit on shaft 4. On one side, it makes sealing engagement with end plate 2 through frusto-conical sealing ring 7; on the other, it makes sealing engagement with impeller hub 6 through frusto-conical sealing ring 8. In each case, the angle of taper of the frusto-conical surface is small; i.e., less than 7½°.

Like certain of the sealing units of the above-mentioned prior application, the sealing unit of FIGURE 2 of the present application makes use of two annular leaf springs. Indicated generally at 9 and 10, these springs are so constructed and so interfitted that each may be described as mounted on the other. To this end, each of springs 9 and 10 carries along its inner periphery an axially extending mounting flange. Respectively, these are designated 12 and 13. One of these flanges is received within the other, thus establishing an interconnection between the springs. A suitable bond between mounting flange 12 and mounting flange 13 should be provided, as, for example, the typical seam-like bond (not shown) that results from resistance welding.

In the form of the invention shown in FIGURES 1 to 4, springs 9 and 10 carry at their outer peripheries lip-like supporting flanges 14 and 15. These flanges, which are circular in shape, usually project normally or nearly normally to the general planes of the springs. Between mounting flange 12 and supporting flange 14, spring 9 has an arcuate portion 16 of short radius of curvature; similarly, an arcuate portion 17 of short radius of curvature characterizes spring 10 between mounting flange 13 and supporting flange 15. Resistance-welded to supporting flanges 14 and 15, respectively, are annular supporting members 18 and 19 for sealing rings 7 and 8.

Mention has already been made of the fact that the frusto-conical or holding faces of sealing rings 7 and 8 are characterized by a small taper; e.g., a taper less than about 7½°. In the preferred embodiment of the invention, this angle is 6°. In FIGURE 2 of the drawings, relationships have been exaggerated in such a way and to such an extent that holding face 20 of sealing ring 7 and holding face 21 of sealing ring 8 are shown as tapering at a somewhat greater angle. A like exaggeration will be noted in annular supporting members 18 and 19 in FIGURE 3. These exaggerations are solely for the sake of clarity in the drawings and are without other significance.

Supporting members 18 and 19 take the form of slant-bottom channels of annular configuration. As appears from FIGURE 3, which includes sections through spring 10 and supporting member 19, channel bottom 22 is inclined at an angle of about 45° to the longitudinal axis A—A of the sealing unit. See also FIGURE 4. At corner 23, channel bottom 22 makes an acute angle with inner channel wall 25; at corner 24, it makes an obtuse angle with outer channel wall 26. The degree of inclination is indicated by angle $a$ (FIGURE 4). Angle $a$ may vary, but apparently should not be much less than 30° or much more than 60°.

Other angles appearing in FIGURE 4 are indicated by letters $b$, $c$, and $d$. Angle $b$ corresponds to the angle of taper of holding face 21 of sealing ring 8. Thus it measures less than about 7½° and, in the preferred embodiment of the invention, about 6°. This degree of taper normally produces tenacious adherence between the contacting surfaces. Angle $c$ is equal to the sum of angles $a$ and $b$ and thus measures about 51°. Angle $d$, which is of considerable importance for the purposes of the invention, is an obtuse angle. In the preferred embodiment of the invention, it measures 135°.

Referring again to FIGURE 4, it will be noted that corner 24 is adapted to serve as a hinge when the sealing ring, on being introduced into the sealing unit, is urged into engagement with the inner wall of supporting channel. Distortions in the sealing ring and supporting channel incident to the introduction of the sealing ring are accepted and tolerated by both the sealing ring and supporting channel by virtue of the high degree of flexibility characterizing the construction. If the sealing unit heats up in use, either under ambient temperature conditions are as a result of exposure to much elevated temperatures, angle $d$ adjusts itself as needed. Thermal growth of the sealing ring as a result of an increase in temperature presents no problem, whether on the sealing face or elsewhere, for the reason that the sealing ring, if centered originally, remains centered in relation to the longitudinal axis of the sealing unit as a whole.

It will be noted that in the preferred embodiment of the invention (FIGURE 2) lip-like flange 15 parallels the central axis A—A of the sealing unit; i.e., it extends at a right angle to the general plane of spring 10. It is not necessary that the angle so formed be a right angle: it may be either more or less. If, however, this angle is a right angle, outer channel wall 26 also should parallel central axis A—A of the sealing unit, as shown in FIGURES 2 and 4. Since inner channel wall 25 departs from parallelism with outer channel wall 26 by only 6° in this embodiment of the invention, the two may be said to be approximately parallel.

The parallelism between the two would be perfect if lip-like supporting flange 15 were flared outwardly by 6° and outer channel wall 26 were angled inwardly to correspond. A typical modification which calls for a greater degree of flare is illustrated in FIGURE 5. Here outer channel wall 28 is angled inwardly to correspond to an outwardly flared lip-like flange (not shown) on the spring. Inner channel wall 25, like channel bottom 22, remains as in FIGURE 4: however, angle $d'$, corresponding to angle $d$ in FIGURE 4, may be materially less than 135°; e.g., it may be 120° or even less. Although this case is not one of perfect parallelism between the two side walls of the channel, inner wall 25 and outer wall 28 can nevertheless be said to be approximately parallel.

If, instead of extending normally to the general plane of spring 10 or being flared outwardly as in the case just described, lip-like flange 15 is angled in the opposite direction; i.e., so that the flange appears to converge outwardly, the situation that results may be exemplified by FIGURE 6. Here inner channel wall 25, like channel bottom 22, remains unchanged; however, outer channel wall 30 conforms to the convergence of the supporting flange. The net effect is of course to increase angle $d''$, which in such case may measure 150° or more. It is evident that a channel so formed may aptly be described as having a slanted bottom wall.

If a dotted line is drawn as indicated at 27 in FIGURE 4 or at 29 in FIGURE 5 or at 31 in FIGURE 6, the figure defined by the dotted line, the channel bottom, and the two side walls of the channel is trapeziform. As above explained, there may be situations in which the inner and outer channel walls are in perfect parallelism with each other (in which case the figure is a trapezoid) and others in which no two sides are parallel (in which case the figure is a trapezium). The term "trapeziform" is frequently used to embrace both types of figures. As employed in the specification and claims hereof, both trapezia and trapezoids are comprehended by the term.

In a symmetrical system, these relationships of course hold true for channel 18 as well as for channel 19.

It has been shown that, for the purposes of the invention, angle $d$ can to best advantage be of the order of 135° plus or minus a few degrees, although, as already brought out, it may be substantially reduced (angle $d'$) or substantially enlarged (angle $d''$). An equivalent construction would result if channel bottom 22 were inclined in the opposite direction. In all of these cases, the channel bottom is slanted in such manner as to make an acute angle with one channel wall and an obtuse angle with the other. Where such relationships obtain, the flexibility characterizing the annular supporting member, particularly where the channel bottom impinges on the side walls of the channel, appears to be responsible for preventing undesired release of the sealing ring when subjected to forces less than those normally required to dislodge it.

It is intended that the patent shall cover, by summarization in appended claims, all features of patentable novelty residing in the invention.

What is claimed is:

1. A sealing unit comprising an annular leaf spring provided with a peripheral supporting lip; a sealing ring spaced from but supported by said supporting lip, said sealing ring taking the form of a frusto-conical annulus; and, connected on one side to the sealing ring and on the other to the supporting lip, an annular channel having a first side wall that conforms in shape to the shape of the frusto-conical surface of the sealing ring, a second side wall that substantially parallels the central axis of the sealing unit, and a sharply inclined bottom wall slanted at an acute angle to said first side wall and at an obtuse angle to said second side wall.

2. A sealing unit according to claim 1 in which the obtuse angle is substantially more than a right angle but substantially less than a straight angle.

3. A sealing unit according to claim 2 in which the acute angle is approximately half a right angle.

4. A sealing unit comprising an annular leaf spring provided with a peripheral supporting lip; a sealing ring spaced from but supported by said supporting lip, said sealing ring taking the form of a frusto-conical annulus; and, connected on one side to the sealing ring and on the other to the supporting lip, an annular channel having a first side wall that conforms in shape to the shape of the frusto-conical surface of the sealing ring, a second side wall that approximately parallels said first side wall, and a sharply inclined bottom wall slanted at an acute angle to said first side wall and at an obtuse angle to said second side wall.

5. A sealing unit according to claim 4 in which the obtuse angle measures substantially more than 90° but substantially less than 180°.

6. A sealing unit according to claim 5 in which the acute angle measures about 45°.

7. In a sealing assembly for shafts, bearings and the like, two oppositely directed sealing rings; annular supporting means for said sealing rings comprising slant-bottom channels of generally trapeziform cross-section, the channel bottom in each case forming an acute angle with at least one of the two side walls of the channel; two annular metal springs by which said supporting means are carried; and means connecting said springs.

8. A sealing assembly according to claim 7 in which the channel bottom forms an obtuse angle with the other of the two side walls of the channel.

9. A sealing assembly according to claim 7 in which the channel bottom forms an angle of less than 90° with one and an angle of not less than 90° with the other of the two side walls of the channel.

10. In a sealing assembly for shafts, bearings and the like, a first annular metal spring having inner and outer peripheries and a bowed portion between them; a second annular metal spring having inner and outer peripheries and a bowed portion between them; a mounting flange on each of said springs along one of its two peripheries, said mounting flanges engaging each other; a lip-like supporting flange on each of said springs along the other of its two peripheries; annular supporting means carried by said lip-like flanges comprising slant-bottom channels of generally trapeziform cross-section, the channel bottom in each case forming an acute angle with one of the two side walls of the channel; and, carried by said annular supporting means, sealing rings provided with outwardly directed faces for contact with the surfaces to be sealed.

References Cited in the file of this patent

UNITED STATES PATENTS 2,776,851     Heinrich _____ Jan. 8, 1957